United States Patent
Kopp

(10) Patent No.: US 12,422,544 B2
(45) Date of Patent: Sep. 23, 2025

(54) METHOD FOR ALLOCATING DYNAMIC OBJECTS TO TRAFFIC LANES OF A ROAD

(71) Applicant: Robert Bosch GmbH, Stuttgart (DE)

(72) Inventor: Michael Kopp, Beilstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 352 days.

(21) Appl. No.: 18/158,636

(22) Filed: Jan. 24, 2023

(65) Prior Publication Data

US 2023/0243958 A1 Aug. 3, 2023

(30) Foreign Application Priority Data

Jan. 31, 2022 (DE) ...................... 10 2022 200 970.3

(51) Int. Cl.
*G01S 13/89* (2006.01)
*B60W 40/04* (2006.01)
*G01S 13/42* (2006.01)

(52) U.S. Cl.
CPC ............. *G01S 13/89* (2013.01); *B60W 40/04* (2013.01); *G01S 13/42* (2013.01); *B60W 2420/408* (2024.01); *B60W 2554/20* (2020.02); *B60W 2554/40* (2020.02)

(58) Field of Classification Search
CPC ...... G05D 1/021; G05D 1/0257; G01S 13/89; G01S 13/931; G01S 13/42; B60W 40/04; B60W 2554/20; B60W 2554/40; B60W 2554/408
See application file for complete search history.

(56) References Cited

U.S. PATENT DOCUMENTS

| | | | | |
|---|---|---|---|---|
| 8,065,084 B2* | 11/2011 | Urban | ................... | B60W 40/02 701/96 |
| 8,355,540 B2* | 1/2013 | Walter | ................. | G06V 20/588 382/104 |
| 8,718,919 B2* | 5/2014 | Leineweber | ........... | G08G 1/163 340/913 |
| 9,707,961 B1* | 7/2017 | Halder | ............. | B60W 50/0097 |
| 10,002,537 B2* | 6/2018 | Chen | .................... | G08G 1/0112 |
| 10,641,892 B2* | 5/2020 | Khlifi | .................... | B60W 30/12 |
| 10,997,435 B2* | 5/2021 | Abbott | ....................... | G06T 7/70 |
| 11,537,139 B2* | 12/2022 | Rankawat | ............ | G05D 1/0088 |
| 11,648,945 B2* | 5/2023 | Sajjadi Mohammadabadi ........... G06N 3/045 382/104 |
| 12,012,108 B1* | 6/2024 | Pronovost | ......... | B60W 50/0098 |
| 2003/0060969 A1* | 3/2003 | Waite | ................... | G08G 1/0104 701/117 |
| 2009/0055095 A1* | 2/2009 | Urban | ................... | B60W 40/02 701/301 |
| 2009/0067675 A1* | 3/2009 | Tan | ....................... | G01S 13/931 382/104 |
| 2011/0040468 A1* | 2/2011 | Leineweber | ........... | G08G 1/165 701/96 |

(Continued)

*Primary Examiner* — Peter M Bythrow
(74) *Attorney, Agent, or Firm* — NORTON ROSE FULBRIGHT US LLP

(57) ABSTRACT

A method for allocating dynamic objects to traffic lanes of a road. Objects are detected in a radar measurement and are subdivided into dynamic objects and static objects. A roadway edge is determined from the static objects. Here, the lane allocation of the dynamic object is made from the distance of a dynamic object to at least one static object marking the roadway edge.

17 Claims, 2 Drawing Sheets

(56) References Cited

U.S. PATENT DOCUMENTS

| | | | |
|---|---|---|---|
| 2012/0150437 A1* | 6/2012 | Zeng | B60W 30/12 342/357.33 |
| 2013/0182957 A1* | 7/2013 | Wujcicki | G01C 21/3848 382/199 |
| 2016/0167582 A1* | 6/2016 | Chen | G06V 20/588 348/148 |
| 2016/0171893 A1* | 6/2016 | Chen | G08G 1/0112 701/300 |
| 2018/0074507 A1* | 3/2018 | Gao | B60W 60/00253 |
| 2018/0216944 A1* | 8/2018 | Mielenz | G06V 20/56 |
| 2019/0100200 A1* | 4/2019 | McNew | G06V 20/588 |
| 2019/0333381 A1* | 10/2019 | Shalev-Shwartz | G05D 1/2437 |
| 2020/0218913 A1* | 7/2020 | Unnikrishnan | G01S 13/867 |
| 2020/0365029 A1* | 11/2020 | Kourous-Harrigan | G08G 1/167 |
| 2020/0394423 A1* | 12/2020 | Lenz | G06V 20/58 |
| 2021/0063200 A1* | 3/2021 | Kroepfl | C03C 17/3644 |
| 2021/0347382 A1* | 11/2021 | Huang | G05D 1/0212 |
| 2022/0135078 A1* | 5/2022 | Refaat | G06N 20/00 701/25 |
| 2022/0185334 A1* | 6/2022 | Bae | B60W 60/0011 |
| 2023/0067464 A1* | 3/2023 | Jonietz | G08G 1/0112 |
| 2023/0154320 A1* | 5/2023 | Sasatani | B60W 60/0011 701/26 |
| 2024/0001958 A1* | 1/2024 | Garimella | B60W 60/00274 |
| 2024/0051549 A1* | 2/2024 | McGrory | B60W 40/105 |
| 2024/0132112 A1* | 4/2024 | Afshar | G01C 21/32 |

\* cited by examiner

METHOD FOR ALLOCATING DYNAMIC OBJECTS TO TRAFFIC LANES OF A ROAD

CROSS REFERENCE

The present application claims the benefit under 35 U.S.C. § 119 of German Patent Application No. DE 10 2022 200 970.3 filed on Jan. 31, 2022, which is expressly incorporated herein by reference in its entirety.

FIELD

The present invention relates to a method for allocating dynamic objects to traffic lanes of a road in radar measurements, in particular in a vehicle.

BACKGROUND INFORMATION

Today, many functions are employed in motor vehicles that use radar measurements and objects on a road determined from these radar measurements. In the objects, a distinction is made between dynamic objects that move (not only relative to the motor vehicle) and static objects that occupy a fixed position. Typically, dynamic objects are of greater importance as they represent other vehicles, pedestrians and the like, in traffic. Static objects mostly represent the infrastructure, such as traffic signs, guardrails, guide posts, road lights, bridges, but also parked motor vehicles. The edge of the roadway can be determined from these.

Typically, it is also important for the functions in which traffic lane the dynamic objects are located, particularly when they are other vehicles. An example of such a function is the distance-dependent speed control, also referred to as autonomous cruise control or adaptive cruise control (ACC), in which the speed of the ego vehicle is controlled as a function of a distance to a target object, for example another vehicle located in front of the motor vehicle, and optionally as a function of its speed. It is important in this regard that the control is performed for a dynamic target object located in the ego vehicle's own traffic lane and not for a dynamic object in another traffic lane, such as for example in the lane of oncoming traffic. Such functions require lane allocation of the dynamic objects.

In some systems, a map is used and the ego vehicle is located on the map. Thus, it is determined where the vehicle is on the map. For this purpose, a global position and a global pose, from which the orientation of the vehicle is ascertained, are determined for the vehicle. The dynamic objects are then projected onto the map and finally the lane allocation is realized via the map. From the position and orientation of the ego vehicle as well as the measured relative position of the viewed dynamic object with respect to the ego vehicle, it is determined in which lane the dynamic object is located. Thus, the radar measurement data and localization are fused together.

Even a small error in the orientation of the ego vehicle may be sufficient to predict a dynamic object in an incorrect lane, especially when it is far away. As an example, with a lane width of 4 m for a vehicle 100 m away, an error in orientation of 1.5° is already sufficient to associate the vehicle with an incorrect lane.

SUMMARY

According to an example embodiment of the present invention, in the method for allocating dynamic objects to traffic lanes of a road, in a radar measurement of the environment, objects are detected, the objects are subdivided into dynamic objects and static objects, and an edge of the roadway is determined from the static objects. For the dynamic object, a distance is determined to at least one static object that marks the edge of the roadway. This distance is then used to perform a lane allocation for the dynamic object. For example, for a two-lane road, dynamic objects that are closer to the right roadway edge are allocated to a right lane and dynamic objects that are closer to the left roadway edge are allocated to a left lane.

Consequently, the lane allocation of the dynamic objects in this method is based on a variable obtained directly from the radar measurement and the objects detected therein. Via the distance, the dynamic objects and the roadway edge obtained from the static objects are placed in relation in the same reference system. The distance is thus not subject to an error resulting from an incorrect orientation of the vehicle. As a result, lane allocation becomes more reliable and less prone to errors. A function, such as, e.g., a distance-dependent speed control, is now able to use the dynamic object with lane allocation instead of the dynamic object from the radar measurement.

For this method, the lane allocation may also be performed without localizing the vehicle. The objects are obtained from a radar measurement of the environment, as described above, and may be evaluated using a heuristic based method (heuristic method).

In particular, according to an example embodiment of the present invention, the roadway edge is determined from the static objects by a heuristic method. For this purpose, the static objects can be entered into a fixed grid and the roadway edge can be estimated therefrom. For this purpose, either only the distribution of the static objects may be taken into account or known relationships between the course of the static objects and the roadway edge may be used as well.

According to an example embodiment of the present invention, preferably, the lane allocation may be evaluated for each dynamic object using a heuristic method. For this purpose, at least one traffic lane center may be estimated. For wide roads with multiple lanes, the traffic lane center is estimated preferably for each lane. Typically, the distance between the two roadway edges may be used to estimate in a straightforward manner how many lanes the road has. The width of the individual lane is usually dependent on the type of road, for example freeway, highway, municipal roads. In the case of ambiguities—for example, a two-lane freeway is similarly wide as a three-lane highway—further factors may preferably be consulted in the heuristic process. On the one hand, the distribution of the dynamic objects may be considered. If the dynamic objects cannot be clearly allocated, the number of estimated traffic lanes and/or the model of the road may be incorrect and a different model for the road, particularly with a different number of traffic lanes, is used. Secondly, the speed of the ego vehicle and/or of the other dynamic objects may be considered. A high intrinsic speed and no dynamic objects with speeds opposite to the ego vehicle are indicative of a freeway. Thirdly, the distribution of static objects may be considered. Preferably, classifiers may be trained for this purpose that classify the type of road based on the distribution of the static objects. In the lane allocation, the traffic lane center closest to the dynamic object may now be determined. The dynamic object can then be allocated to the lane with the nearest traffic lane center. The allocation via the nearest traffic lane center is a simple form of implementation, particularly on roads with multiple traffic lanes.

Optionally, according to an example embodiment of the present invention, it may be provided to store the allocation of the objects to the lanes over a specifiable period of time, and only to perform a new lane allocation if the allocation of the objects has consistently changed for a period of time.

Such heuristic methods are simpler and more cost effective to realize than a localization of the vehicle. The method for lane allocation according to the present invention can thus also be implemented in simple systems. In addition, a map is not required when using the heuristic method.

According to an example embodiment of the present invention, advantageously, if a map is present, for example, in a localization, additional information from the map may be used in the lane allocation. Such additional information is, for example, the width of the roadway, the distance between the roadway edge and the roadway center, or the like. Alternatively or additionally, objects at the edge of the roadway may also be drawn in the map, which are measured as static objects during the radar measurement. Thus, additional information is stored in the map that simplifies the lane allocation.

If localizing the vehicle is provided, particularly if it is needed for another driving function, the lane allocation according to the method of the present invention preferably takes place during the localization. The map described above is required in the localization. The additional information may advantageously be used as described above. The data of the localization can be used in order to simplify, refine and/or accelerate the lane allocation.

According to an example embodiment of the present invention, a computer program is configured to perform each step of the method, particularly when performed on a computer or controller. It enables the implementation of the method in a conventional electronic control unit without having to make structural changes. For this purpose, it is stored on the machine-readable storage medium.

By installing the computer program on a conventional electronic control unit, the electronic control unit is obtained, which is configured to perform a lane allocation for dynamic objects.

BRIEF DESCRIPTION OF THE DRAWINGS

Embodiment examples of the present invention are illustrated in the figures and explained in more detail in the following description.

DETAILED DESCRIPTION OF EXAMPLE EMBODIMENTS

Figure 1:
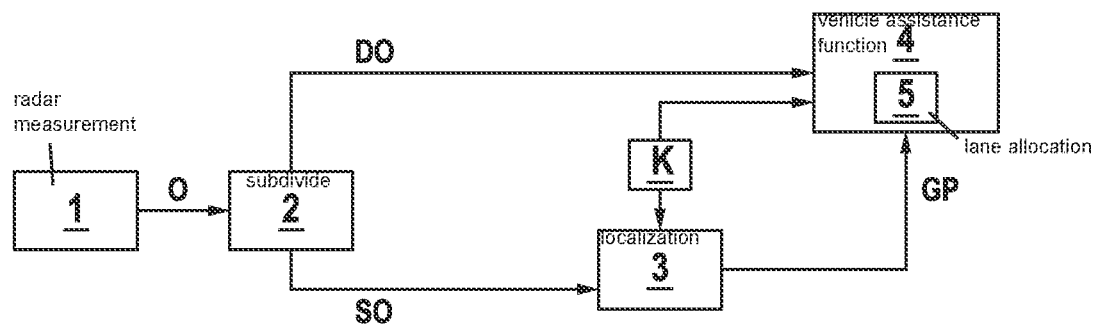
FIG. 1 shows a flow chart of a method for lane allocation in accordance with the related art.

FIG. 1 shows a method for lane allocation in accordance with the related art. A radar sensor installed in a vehicle FZ (see FIG. 4) performs a radar measurement 1, thereby detecting objects O in the environment of the vehicle FZ. The objects O are subdivided 2 into static objects SO that do not move globally and dynamic objects DO that move globally. Conventional methods can be used for subdivision 2, which, for example, determine the speed of the object O relative to the radar sensor from the Doppler shift of the received signal with respect to the transmitted signal in the radar measurement and relate this speed to the intrinsic speed of the radar sensor or the vehicle FZ. The stationary objects SO are used for the localization 3 of the vehicle FZ. Using a map K, the localization 3 determines the global position GP of the vehicle FZ, which also contains a global pose of the vehicle FZ. The global position GP of the vehicle FZ and map K are supplied to a vehicle assistance function 4, for example a distance-dependent speed control. The dynamic objects DO are also supplied to the vehicle assistance function 4 independently of the localization 3. Vehicle assistance function 4 now executes a lane allocation 5 of the dynamic objects DO based on the global position GP of the vehicle FZ, the global pose of the vehicle FZ, the map K, and the relative positions of the dynamic objects DO determined in radar measurement 1. The traffic lanes of the road are taken from map K. The dynamic objects DO are projected into the map K by means of the distance of the dynamic objects DO to the vehicle FZ, the global position GP of the vehicle FZ, and the orientation of the vehicle FZ derived from the global pose of the vehicle FZ.

Figure 2:
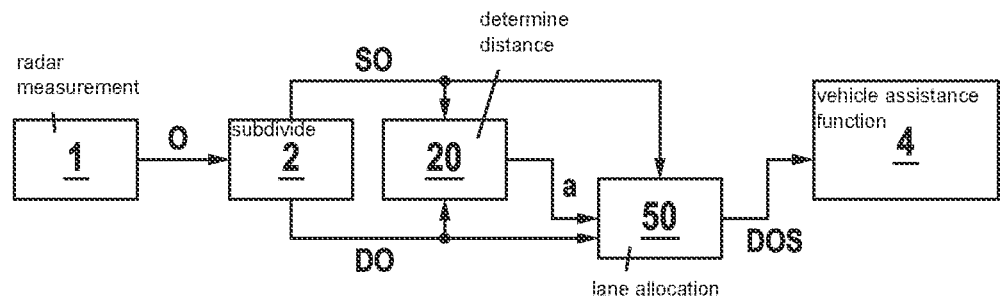
FIG. 2 shows a flow chart of a first embodiment example of the method for lane allocation according to the present invention.

FIG. 2 shows a first embodiment example of the method according to the present invention. Here too, a radar sensor installed in a vehicle FZ (see FIG. 4) performs a radar measurement 1, thereby detecting objects O in the environment of the vehicle FZ. The objects O are likewise subdivided into static objects SO and dynamic objects DO 2. Reference is made to the description for FIG. 1 in this regard. According to the present invention, for each dynamic object DO to be examined, the (respective) distance a to one or more static objects SO that mark the roadway edge AFR (see FIG. 4) is determined 20. For this purpose, the closest stationary objects SO, clearly assignable stationary objects SO, and/or preferably stationary objects SO in different directions, can be used. From distance a, a lane allocation 50 is performed for each dynamic object DO. In this embodiment example, the lane allocation 50 is based on a heuristic method. For example, the static objects SO are entered into a fixed grid and the roadway edge is estimated therefrom. For multiple traffic lanes, the traffic lane center is estimated for each lane. Then, the traffic lane center is determined which is closest to the dynamic object DO. The allocation is then done via the distance a of the dynamic object to the actual roadway edge AFR and via the nearest traffic lane center. The heuristic method is less complex compared to a localization 3 and does not use map K. Thus, the method according to the present invention may also be performed in simple systems without localization function. Finally, the dynamic objects with lane allocation DOS are supplied to a vehicle assistance function 4, such as distance-dependent speed control.

Figure 3:
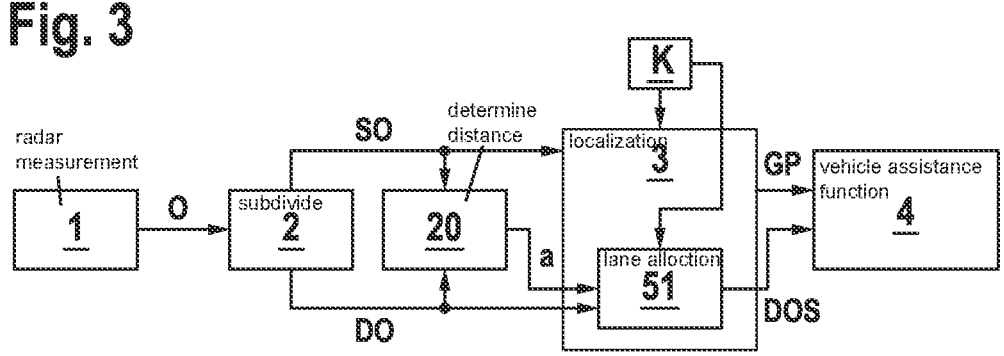
FIG. 3 shows a flow chart of a second embodiment example of the method for lane allocation according to the present invention.

FIG. 3 shows a second embodiment example of the method according to the present invention. The second embodiment example differs from the first embodiment example in that a localization 3 is also performed, which is used, for example, for other vehicle functions. As described above, a radar sensor installed in a vehicle FZ (see FIG. 4) also performs a radar measurement 1 here, thereby detecting objects O in the environment of the vehicle FZ. The objects O are also subdivided 2 into static objects SO and dynamic objects DO. According to the present invention, for each dynamic object DO to be examined, the distance a to one or more static objects SO that mark the roadway edge is determined 20. In this second embodiment example, the lane allocation 51 of the dynamic targets DO is performed during the localization 3. The localization 3 furthermore determines, using a map K, the global position GP of the vehicle FZ, which also includes a global pose of the vehicle FZ. Here too, for the lane allocation 51, a heuristic method may be used as described in the first embodiment example, which only uses distance a of the dynamic object DO to one or more static objects SO. In this embodiment example, additional information from map K is used in lane allocation 51. The additional information includes, for example, the width of the roadway, the distance of stationary objects at the edge from the center of the roadway, etc. This additional information is particularly used so as to be able to determine the traffic lanes more readily and accurately. This makes it possible to perform the lane allocation 51 more readily, more precisely, and/or faster. Finally, the dynamic objects with lane allocation DOS are supplied to a vehicle assistance function 4, such as distance-dependent speed control.

Figure 4:
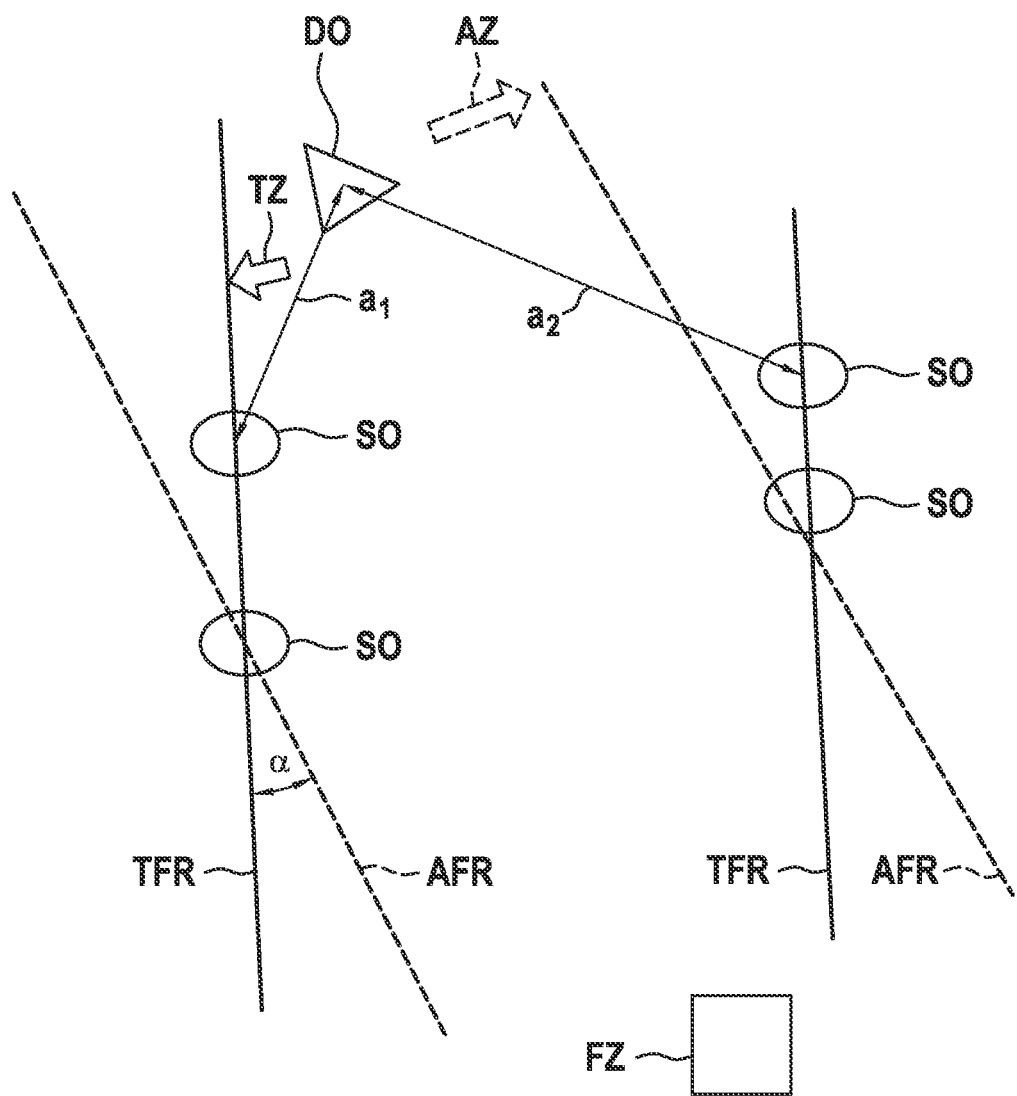
FIG. 4 shows a schematic representation of an actual and an assumed roadway, of a vehicle, and of various objects, according to an example embodiment of the present invention.

FIG. 4 shows a road with an actual roadway represented by the actual roadway edges TFR and an assumed roadway represented by the assumed roadway edges AFR as well as a vehicle FZ driving on the road. As described above, the vehicle FZ performs a radar measurement 1 and detects multiple stationary objects SO as well as in this example a dynamic object, such as, e.g., a different vehicle. The stationary objects SO, along with the global position GP of the vehicle FZ and the orientation of the vehicle FZ, are used to determine the assumed roadway edges AFR. Due to a deviating orientation of the vehicle FZ, in this example, the assumed roadway edges AFR are shown to be turned by an angle $\alpha$ relative to the actual roadway edges TFR. Thus, it is assumed here that the assumed roadway does not match the actual roadway. The angle $\alpha$ is selected in this representation for the purposes of illustration to be greater than is usual in practice. When looking at the assumed roadway edges AFR, the dynamic object DO is allocated to the right lane, which is expressed by the arrow AZ. However, the dynamic object DO is in fact located in the left lane. The method according to the present invention uses the distances $a_1$ and $a_2$ between the dynamic object DO and the closest stationary objects SO on both sides of the roadway for the lane allocation 50, 51 described above. The distances $a_1$ and $a_2$ are not affected by the incorrect orientation and are independent of the angle $\alpha$. It can be seen that the distance $a_1$ to the left stationary object SO is less than the distance $a_2$ to the right stationary object SO. As a result, the dynamic object DO is correctly allocated to the left lane, as indicated by the arrow TZ.

What is claimed is:

1. A method for allocating dynamic objects to traffic lanes of a road, the method comprising the following steps:
    detecting objects in a radar measurement;
    subdividing the detected objects into dynamic objects and static objects;
    determining a roadway edge from the static objects; and
    allocating a dynamic object to a traffic lane, wherein the traffic lane allocation of the dynamic object is made based on a distance of the dynamic object to at least one of the static objects marking the roadway edge.

2. The method according to claim 1, wherein the traffic lane allocation is performed by a heuristic method.

3. The method according to claim 2, wherein at least one traffic lane center is estimated by a heuristic method and the traffic lane allocation is based on a distance between the dynamic object and the traffic lane center.

4. The method according to claim 2, wherein the determination of the roadway edge from the static objects is carried out by a heuristic method.

5. The method according to claim 1, wherein additional information from a map is used in the traffic lane allocation of the dynamic object.

6. The method according to claim 1, wherein the traffic lane allocation of the dynamic object takes place during a localization.

7. A non-transitory machine-readable storage medium on which is stored a computer program for allocating dynamic objects to traffic lanes of a road, the computer program, when executed by a computer, causing the computer to perform the following steps:
    detecting objects in a radar measurement;
    subdividing the detected objects into dynamic objects and static objects;
    determining a roadway edge from the static objects; and
    allocating a dynamic object to a traffic lane, wherein the traffic lane allocation of the dynamic object is made based on a distance of the dynamic object to at least one of the static objects marking the roadway edge.

8. An electronic control unit configured to perform a lane allocation for dynamic objects, the electronic control unit configured to:
    detect objects in a radar measurement;
    subdivide the detected objects into dynamic objects and static objects;
    determine a roadway edge from the static objects; and
    allocate a dynamic object to a traffic lane, wherein the traffic lane allocation of the dynamic object is made based on a distance of the dynamic object to at least one of the static objects marking the roadway edge.

9. The electronic control unit according to claim 8, the electronic control unit further configured to:
    determine at least two roadway edges from at least two of the static objects; and
    allocate the dynamic object to the traffic lane based on at least two distances of the dynamic object to the at least two static objects marking the at least two roadway edges.

10. The electronic control unit according to claim 9, wherein the at least two distances of the dynamic object comprises a first distance of the dynamic object to a first static object at a first roadway edge of the at least two roadway edges and a second distance of the dynamic object to a second static object at a second roadway edge of the at least two roadway edges.

11. The electronic control unit according to claim 10, the electronic control unit further configured to:
    allocate the dynamic object to a traffic lane closest to the first roadway edge based on the first distance being less than the second distance; and
    allocate the dynamic object to a traffic lane closest to the second roadway edge based on the second distance being less than the first distance.

12. The method according to claim 1, the method further comprising:
    determining at least two roadway edges from at least two of the static objects; and
    allocating the dynamic object to the traffic lane based on at least two distances of the dynamic object to the at least two static objects marking the at least two roadway edges.

13. The method according to claim 12, wherein the at least two distances of the dynamic object comprises a first distance of the dynamic object to a first static object at a first roadway edge of the at least two roadway edges and a second distance of the dynamic object to a second static object at a second roadway edge of the at least two roadway edges.

14. The method according to claim 13, the method further comprising:
  allocating the dynamic object to a traffic lane closest to the first roadway edge based on the first distance being less than the second distance; and
  allocating the dynamic object to a traffic lane closest to the second roadway edge based on the second distance being less than the first distance.

15. The non-transitory machine-readable storage medium according to claim 7, wherein the computer further performs the following steps:
  determining at least two roadway edges from at least two of the static objects; and
  allocating the dynamic object to the traffic lane based on at least two distances of the dynamic object to the at least two static objects marking the at least two roadway edges.

16. The non-transitory machine-readable storage medium according to claim 15, wherein the at least two distances of the dynamic object comprises a first distance of the dynamic object to a first static object at a first roadway edge of the at least two roadway edges and a second distance of the dynamic object to a second static object at a second roadway edge of the at least two roadway edges.

17. The non-transitory machine-readable storage medium according to claim 16, wherein the computer further performs the following steps:
  allocating the dynamic object to a traffic lane closest to the first roadway edge based on the first distance being less than the second distance; and
  allocating the dynamic object to a traffic lane closest to the second roadway edge based on the second distance being less than the first distance.

* * * * *